Figure 1:
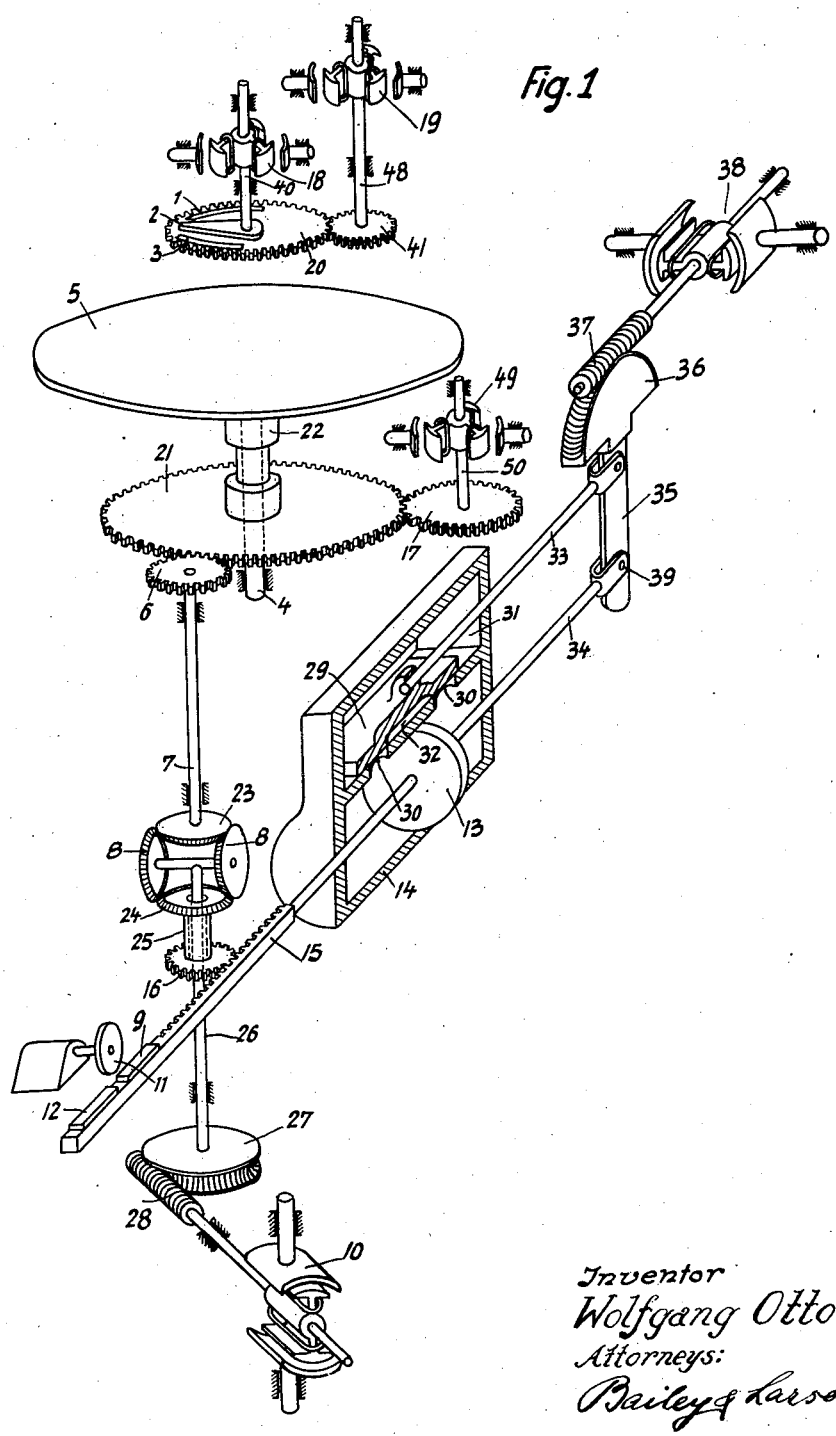

Nov. 20, 1934.  W. OTTO  1,981,827

CONTROLLING SYSTEM

Filed May 25, 1934  2 Sheets-Sheet 1

Inventor
Wolfgang Otto
Attorneys:
Bailey & Larson

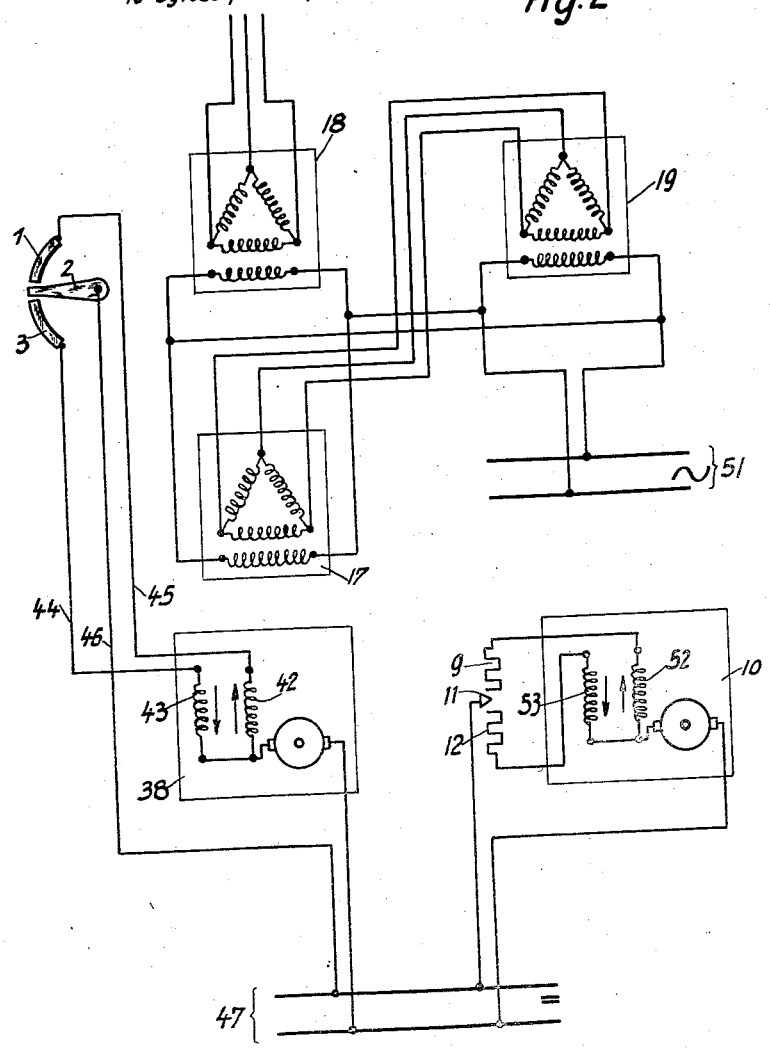

Patented Nov. 20, 1934

1,981,827

UNITED STATES PATENT OFFICE 1,981,827

CONTROLLING SYSTEM

Wolfgang Otto, Kitzeberg, near Kiel, Germany, assignor to Nederlandsche Technische Handel Maatschappij "Giro", The Hague, Netherlands Application May 25, 1934, Serial No. 727,568
In Germany June 7, 1933

8 Claims. (Cl. 33—204)

My invention relates to a controlling system and, more particularly, to a follow-up system in which a remote-controlled body is caused by one or more servomotors to perform a movement prescribed by a controlling member, for instance by a member which is mounted on a movable support and is kept by a gyroscope in an invariable position relative to the meridian and/or to the horizon. Controlling systems of this character may be used for stabilizing heavy bodies mounted on a movable support such as search lights mounted on board ship.

More particularly, my invention is concerned with the arrangement and control of the servomotors acting on the bodies to be stabilized. Experience has shown that the use of high-powered electric motors for this purpose involves certain disadvantages flowing from the considerable inertia of the armatures which will delay the response to controlling impulses and will invariably produce overthrow whereby the accuracy and reliability of the operation is seriously impaired. As the considerable power required for stabilizing heavy bodies necessitates the provision of electric motors having large armatures operating at a comparatively high speed, the inertia of these armatures will cause a considerable delay in initiating and terminating the prescribed movements under control by the controlling member. Consequently, the prescribed movement will be inaccurately performed and, due to the overthrow, the body will tend to oscillate about its theoretically correct position.

Hydraulically operated motors are far superior to electric motors as far as the tendency to overthrow is concerned, because of the smaller speed and inertia of their moving parts. However, the simplest and most desirable type of such motors which is the reciprocatory piston is limited in its applicability by the limitation of its range of movement. If it is desired to produce turns through a large angle, for instance more than 360°, it is no longer possible to use a simple piston as a servomotor because the resulting dimensions of the cylinder would become prohibitive. Under certain conditions, the body to be stabilized must be turned through an unlimited angle, for instance in the event of the stabilization of a search light, a telescope or the like, relative to the meridian on a ship which may perform one or more complete turns. Prior to my invention, hydraulic pistons could not be used for this purpose.

The object of my invention is the provision of a controlling system in which the superior qualities of the electric servomotors are coupled with those of the hydraulic motors while the disadvantages of both are entirely eliminated. Broadly speaking, the object is to provide a controlling system in which the servomotors are capable of performing the prescribed movement with great accuracy and, at the same time, through an unlimited range of movement and with great power. I attain this object by the coordination to a hydraulic servomotor of an electric servomotor which is also adapted to act on the body to be stabilized. In this combination, the electric motor is operative to produce the prescribed turn of any desired extent with a certain approximation, while the hydraulic motor will compensate for the unavoidable inaccuracies which are due to the inertia of the armature of the electric motor.

I prefer to gear both servomotors differentially to the body to be stabilized by an epicyclic gear. In this combination, the electric motor is preferably governed by the hydraulic motor in dependence on the departure of the latter from a normal range of movement, while the hydraulic motor is controlled by the follow-up contacts in the customary manner. This has the effect that the electric motor tends to keep the hydraulic motor within its normal range of movement or to restore the same to said range if it should have left the same temporarily.

A preferred embodiment of my invention is illustrated in the accompanying drawings in which Fig. 1 is a diagrammatic isometric view of a controlling system in which a body mounted on a ship is to be stabilized relative to the meridian, the hydraulic motor being shown in section, while Fig. 2 illustrates the electric circuit arrangement.

In the system illustrated in Fig. 1 a body 5 in form of a rotary platform is to be kept in an invariable position relative to the meridian under control by a gyroscopic compass. For this purpose the platform 5 is mounted on an upright trunnion 4 secured to the structure of the ship and is attached by its bearing sleeve 22 to a gear 21 which meshes with a pinion 6 fast on a vertical shaft 7.

For sake of simplicity it is to be understood that all of the shafts to be referred to hereinafter are mounted in bearings which are attached to the structure of the ship unless specifically stated otherwise.

Shaft 7 is differentially coupled to a rotary servomotor, preferably an electric motor, and to a reciprocatory motor which is preferably in form of a hydraulic piston.

For this purpose, the lower end of shaft 7 carries a bevel gear 23 which is coaxially opposed to a similar bevel gear 24 attached to a sleeve 25. A shaft 26 extending through this sleeve carries two planetary bevel gears 8 which mesh with the gears 23 and 24. To the lower end of shaft 26, there is attached a worm wheel 27 which is adapted to be operated by a worm 28 connected to an electric motor 10. The sleeve 25 which is journalled in a suitable bearing carries a spur gear 16 meshing with a reciprocatory rack 15.

The rack 15 is attached to the hydraulic piston 13 which is guided within a cylinder 14 attached to the structure of the ship. The cylinder is integral with a valve chamber 31 in which a slide valve 29 of a well-known type is guided. In its normal position the slide valve closes the two ports 30 which connect the valve chamber 31 with the cylinder. When the slide valve is shifted from its normal position shown in Fig. 1, it will connect one of the two ports 30 with the valve chamber 31 and the other port with a pressure chamber 32. An exhaust conduit (not shown) communicates with the valve chamber 31 whereas the pressure chamber 32 formed by a recess of the slide valve is connected with a suitable source of pressure oil by a conduit not shown. The slide valve 29 is attached to a rod 33 which extends parallel to the piston rod 34 and is also guided in the wall of the cylinder block. The forked end of the rod 33 embraces the upright stem 35 of a worm wheel sector 36 which meshes with a worm 37 connected to a small electric motor 38.

The lower end of the stem 35 is linked by a pivot pin 39 to the forked end of the piston rod 34. The pivot 39 is centrally disposed with regard to the sector 36, and the forked end of the slide valve rod 33 is connected to the stem by a pin and a vertical slot (not shown).

The motor 38 is controlled by the follow-up contacts 1, 2 and 3 to turn in one direction or the other, as will be described later. Assuming that the parts are in the normal position shown in Fig. 1 when the operation of motor 38 commences, and further assuming that the motor performs a predetermined number of turns, it will be seen that the revolution of the worm 37 causes the sector 36 to rock about the pivot 39 as the latter is arrested in its position by the piston 13 which cannot move because of the closed condition of the two ports 30. Therefore, the slide valve 29 will be displaced from its normal position, so as to admit pressure oil to one port and to connect the exhaust conduit with the other port, whereby the piston 13 will be moved in a direction opposite to the displacement of the slide valve. This will cause the sector 36 to rock in the opposite sense and to roll along the worm 37 until the consequent displacement of rod 33 has restored the slide valve 29 to its closing position. As soon as this position is reached, the piston 13 will be arrested in its new position. The displacement of the piston 13 which is in proportion to the number of turns performed by motor 38 causes rack 15 to turn the gear 16 and, assuming motor 10 be at rest, this will produce a corresponding turn of shaft 7 and of the platform 5.

The pivotal member prescribing the movement to be performed by the platform 5 relative to the ship is indicated at 2 and is mounted on a shaft 40 which is remote-controlled by a gyroscopic or other compass through the intermediary of synchronously operating apparatus, such as a sender mounted on the gyroscopic compass (not shown) and a receiver indicated at 18.

As sending and receiving apparatus of this type is well known, a detailed description thereof need not be given herein. I may mention, however, that the sender as well as the receiver comprises an armature provided with three windings in triangle arrangement and a stator having coils energized from a suitable source of alternating current indicated at 51 in Fig. 2. The armature windings of the sender and of the receiver are connected with each other. A turn of the sender armature will produce a corresponding turn of the receiver armature.

The member 2 which will be stabilized in the sense that it will be kept in an invariable position relative to the meridian irrespective of the turns of the ship, is arranged in contact with, and in coaxial relationship to, a rotary disc 20 having a toothed rim meshing with a pinion 41. The disc 20 is provided with two conductive strips 1 and 3 which are slightly spaced and insulated from each other.

The motor 38 is a reversible electric motor having two oppositely acting windings 42 and 43 (Fig. 2) which are connected with the conductive strips 1 and 3 by wires 44 and 45 and are alternatively energized depending on whether strip 1 or 3 contacts with member 2. A wire 46 serves to connect member 2 to a suitable source 47 of direct current.

Pinion 41 is attached to the shaft 48 of a receiver 19 which cooperates with a sender 49 mounted on the shaft 50 of a pinion 17 which meshes with gear 21. The ratio of transmission of the disc 20 and the pinion 41 is the same as that of the gear 21 and the pinion 17. Therefore, a turn of gear 21 will produce an equal turn of disc 20.

Normally, the contact member 2 assumes the normal position shown in Fig. 1 in which it is positioned between and electrically separated from the conductive strips 1 and 3. Upon the slightest turn of the ship, however, one of the conductive strips will contact with the member 2. A consideration of Fig. 2 shows that this has the effect of energizing either winding 42 or winding 43, whereby the motor 38 will be started in one sense of rotation or the other. As explained above, this causes platform 5 and gear 21 to be turned. Sender 49 and receiver 19, however, produce a corresponding turn of disc 20, and this turn will be continued until the disc 20 has been returned to its normal position relative to member 2 in which motor 38 is de-energized.

This operation takes place very rapidly and causes platform 5 to accurately follow any turn prescribed by member 2. Therefore, the platform 5 is turned through the same angle as the ship, but in the opposite direction, so as to be kept stabilized relative to the meridian. Thus, it will be seen that the stabilizing counter-turn of platform 5 will be automatically performed whenever the ship changes its course.

While I have shown contacts 1, 2 and 3 for controlling the hydraulic motor through the intermediary of motor 38, it is to be understood that any other desired mechanism may be employed for controlling the hydraulic servomotor by the member 2. The controller 1, 2 and 3 may be replaced by other equivalent circuit-controlling means, for instance those described in the German Patent No. 556,193 which are free from friction and, hence, will not react on the controlling member.

Up to this point of the description it was tacitly assumed that the motor 10 is at rest. I shall now proceed to explain its function.

As the range of movement of the hydraulic motor 13 is limited, it can impart a limited turn only to shaft 7 and, therefore, would be unable to stabilize the platform 5 properly in the event of a continued turn of the ship in one and the same direction. For this purpose I have provided an arrangement whereby the electric motor will be started when the piston 13 passes beyond a predetermined position.

The end of rack 15 is provided with two spaced conductive strips 9 and 12 which are electrically insulated from each other and are connected with the oppositely acting windings 52 and 53 of the reversible motor 10 in the manner illustrated in Fig. 2. A contact roller 11 mounted in stationary relation relative to the hydraulic motor block is connected to the source of current 47 and adapted to contact with either one of the two strips 9 and 12 depending on the direction of displacement of piston 13. Due to the interposition of the worm 28 and the worm wheel 27 the electric motor 10 will not be reacted upon by the torque exerted by the hydraulic piston 13 on the epicyclic gear.

For a better understanding of the operation of motor 10, it will be assumed that the ship remains in fixed position and that the member 2 is at rest and out of contact with the conductive strips 1 and 3. We shall further assume that the piston 13 may have arrived near one of its end positions and may have brought the roller 11 in contact with one of its strips, and that the circuit of roller 11 has been interrupted. When this circuit is now established, the electric motor 10 is started and turns shaft 26 thereby tending to turn platform 5 and disc 20. As above described, however, the slightest turn of disc 20 initiates an operation of the hydraulic piston 13 in such a sense that the piston 13 moves towards its intermediate position. This movement of the piston compensates for the turn imparted to platform 5 and disc 20 by the electric motor 10. In other words, the simultaneous operations of both servomotors balance each other so that shaft 7 and the elements connected thereto remain in their position. The electric motor will be stopped as soon as the piston 13 arrives in its intermediate position in which the roller 11 loses contact with the associated strips. When the ship turns at the same time, a counter-movement is superimposed to the follow-up movement above described. Depending on the extent of the turn of the ship, the number of revolutions of the electric motor 10 required to restore piston 13 to its intermediate position will be larger or smaller than is the case with the ship being at rest.

Preferably, I provide means whereby the speed of the electric motor 10 will change in proportion to the departure of the piston 13 from its central position or from its normal range of operation. For this purpose the conductive strips 9 and 12 may be formed of a suitable resistive material, for instance as indicated in Fig. 2. In this event the current supplied to winding 52 or 53 of the electric motor 10 will increase in proportion to the departure of the conduit roller 11 from its neutral position. Numerous other equivalent circuit-controlling means may be provided, for instance the circuit-controlling means shown in the German Patent No. 556,193.

When the ship turns at a given velocity the consequent displacement of piston 13 will so adjust the speed of electric motor 10 as to cause a counter-turn of platform 5 and disc 20 at the same velocity, thereby keeping the controller 1, 2 and 3 in its neutral position. In this event, the counter-turn is solely produced by electric motor 10. As soon, however, as the angular velocity of the turning ship increases or decreases, the speed of electric motor 10 will be instantaneously readjusted by piston 13 under command from the controller 1, 2, 3. The effect will be that platform 5 is kept truly stabilized and will move in accurate synchronism with the member 2 relative to the ship without any delay or overthrow. The sense of operation and the speed of the electric motor 10 will be always approximately in proportion to the angular velocity of the ship. The unavoidable delay and overthrow of the electric motor, however, will be fully compensated by the piston 13.

While I have shown the contacts 9 and 12 as being rigidly connected with the piston 13, it is to be understood that numerous other arrangements could be provided.

While I have illustrated an epicyclic gear which connects the body to be stabilized with the two servomotors, it is to be understood that numerous other arrangements may be provided for the purpose of differentially gearing these elements to each other, as is well-known in the art. The arrangement must be so provided, however, that the movements produced by the two servomotors will be combined in the proper sense.

I have found that the above described combination of an electric servomotor with a hydraulic servomotor does not only enhance the accuracy of operation and sensitivity of the controlling system by the elimination of delay and overthrow, but affords the further advantage that the electric motor may be made comparatively small because a temporarily increased power demand will be satisfied by the hydraulic motor. The electric circuit arrangement is considerably simplified by the independence of the electric motor 10 from the controller 1, 2, 3 which controls the hydraulic motor only.

While I have described my improved follow-up system with reference to its application to a stabilizing arrangement, I wish it to be understood that my invention is applicable to numerous other fields, for instance to any controlling system in which a body shall move under command by a controlling member.

What I claim is:

1. In a controlling system, a servomotor unit comprising a hydraulic motor and an electric motor geared to each other, and circuit-controlling means operated by said hydraulic motor and adapted to govern said electric motor.

2. In a stabilizing system, the combination comprising a movable body to be stabilized, a hydraulic servomotor geared to said body, said hydraulic servomotor being of a type having a limited range of movement, a second motor cooperatively connected to said hydraulic servomotor, and controlling means responsive to a passage of said hydraulic servomotor through a certain position and adapted to operate said second motor.

3. A system of the character described including a movable body, a movable member and a follow-up gear governed by said member and adapted to cause said body to follow the movement prescribed by said member, said follow-up gear comprising a hydraulic servomotor of a type having a limited range of movement and an electric motor, both motors being cooperatively geared to said body.

4. In a follow-up gear, the combination with a body to be controlled of a servomotor unit comprising a hydraulic motor consisting of cylinder and piston, an electric motor differentially geared to said hydraulic motor and to said body, and circuit-controlling means operated by said hydraulic motor and adapted to govern said electric motor.

5. In a follow-up gear, the combination with a body to be controlled of a servomotor unit comprising a hydraulic motor consisting of cylinder and piston, an electric motor differentially geared to said hydraulic motor and to said body, and circuit-controlling means operated by said hydraulic motor and adapted to operate said electric motor at a speed which increases with the departure of said piston from a certain position relative to said cylinder.

6. In a system of the character described, a controlling member, a body and a follow-up gear causing said body to perform a movement prescribed by said controlling member, said follow-up gear comprising a hydraulic reciprocatory motor and a rotary motor both being differentially geared to said body to impart said movement jointly to the same.

7. In a system of the character described, a controlling member, a body and a follow-up gear causing said body to perform a movement prescribed by said controlling member, said follow-up gear comprising a hydraulic reciprocatory motor and an electric motor both being differentially geared to said body, and controlling resistances governing said electric motor and adapted to be operated by said hydraulic motor, whereby said electric motor is caused to assist said hydraulic motor in imparting said movement to said body.

8. A system of the character described including a body mounted for pivotal movement, a pivotal member, a hydraulic motor geared to said body, a controller responsive to relative turns of said pivotal member and said body, a controlling valve for said hydraulic motor, said valve being jointly controlled by said controller and said hydraulic motor, whereby the latter causes said body to follow turns prescribed by said pivotal member, an electric motor differentially geared to said body and to said hydraulic motor, and circuit-controlling means operated by said hydraulic motor, when the same passes beyond a certain range of movement, and adapted to govern said electric motor, whereby the latter is caused to operate said controller in a manner causing said hydraulic motor to be returned into said range of movement.

WOLFGANG OTTO.